United States Patent [19]
Chi

[11] Patent Number: 5,352,323
[45] Date of Patent: Oct. 4, 1994

[54] HEAT SEALING APPARATUS

[75] Inventor: James Chi, Taipei, Taiwan

[73] Assignee: Sunfa Plastic Co., Ltd., Taipei, Taiwan

[21] Appl. No.: 138,101

[22] Filed: Oct. 20, 1993

[51] Int. Cl.[5] .................. B65B 31/00; B30B 15/34
[52] U.S. Cl. ..................... 156/583.9; 156/583.8; 53/512; 219/243
[58] Field of Search ............... 156/576, 583.1, 583.8, 156/583.9, 285, 382, 515; 53/405, 512; 219/243

[56] References Cited

U.S. PATENT DOCUMENTS

| | | | |
|---|---|---|---|
| 3,847,712 | 11/1974 | Hubbard | 156/583.9 X |
| 4,093,500 | 6/1978 | Browne | 156/583.9 X |
| 4,104,108 | 8/1978 | Kishida et al. | 156/583.9 X |
| 4,561,925 | 12/1985 | Skerjanec et al. | 156/576 X |
| 4,860,523 | 8/1989 | Teteishi et al. | 53/512 |
| 4,941,310 | 7/1990 | Kristen | 53/512 |
| 5,048,269 | 9/1991 | Deni | 53/512 |

*Primary Examiner*—David A. Simmons
*Assistant Examiner*—J. Sells
*Attorney, Agent, or Firm*—Jacobson, Price, Holman & Stern

[57] ABSTRACT

A heat sealing apparatus includes a top recess on the base, and an arched hole on one side of the rear of top recess; the cover includes a notch on the rear side thereof corresponding to the arched hole of the top recess on the base; a clip is received within the top recess on the base, including a fastened guide tube that comprises a front and a rear end respectively extended out of the clip, the rear end of guide tube being inserted into the arched hole on the base and connected to a vacuum ejector; in operation, the plastic bag first be sealed with a small opening unsealed, then the clip with suction pipe is moved out of the heat sealing apparatus, inserts the guide tube into the small opening of the plastic bag and clamps the bag for suction operation; after suction, the clip with the plastic bag is moved back to the sealing unit and the small opening of the plastic bag is completely sealed.

2 Claims, 2 Drawing Sheets

HEAT SEALING APPARATUS

BACKGROUND OF THE INVENTION

The present invention relates to heat sealing apparatus, especially an improved heat sealing apparatus, which includes a clip to hold a guide tube connected to the vacuum ejector thereof for use in withdrawing air from the plastic bag and then seals it up.

Various heat sealing apparatus with vacuum ejectors have been disclosed, and have appeared on the market. According to these conventional heat sealing apparatus, the suction pipe of the vacuum ejector is directly fixed to the base of the apparatus. When withdrawing air from the plastic bag to be sealed, the effective suction must be limited within a low range in order to prevent the packed item from being drawn into the suction pipe to block up the air passage. Because the suction force must be weak, only the thin plastic bag can be used and the sealing effect is not good. So it is not ideal in practice.

SUMMARY OF THE INVENTION

It is one object of the present invention to provide a heat sealing apparatus which eliminates the aforesaid drawback. It is another object of the present invention to provide a heat sealing apparatus which includes a movable clip fastened with a guide tube connected to the vacuum ejector. The movable clip can be pulled outside of the sealing apparatus for the operation of suction with the assistance of user's hands, and it is provided for clamping the plastic bag to be sealed in position during the process of withdrawing air from the plastic bag. It is still another object of the present invention to provide a heat sealing apparatus which is practical for use with a high performance vacuum ejector.

BRIEF DESCRIPTION OF THE DRAWINGS

The present invention will now be described by way of examples with reference to the annexed drawings, in which.

DETAILED DESCRIPTION OF THE PREFERRED EMBODIMENT

Figure 1:
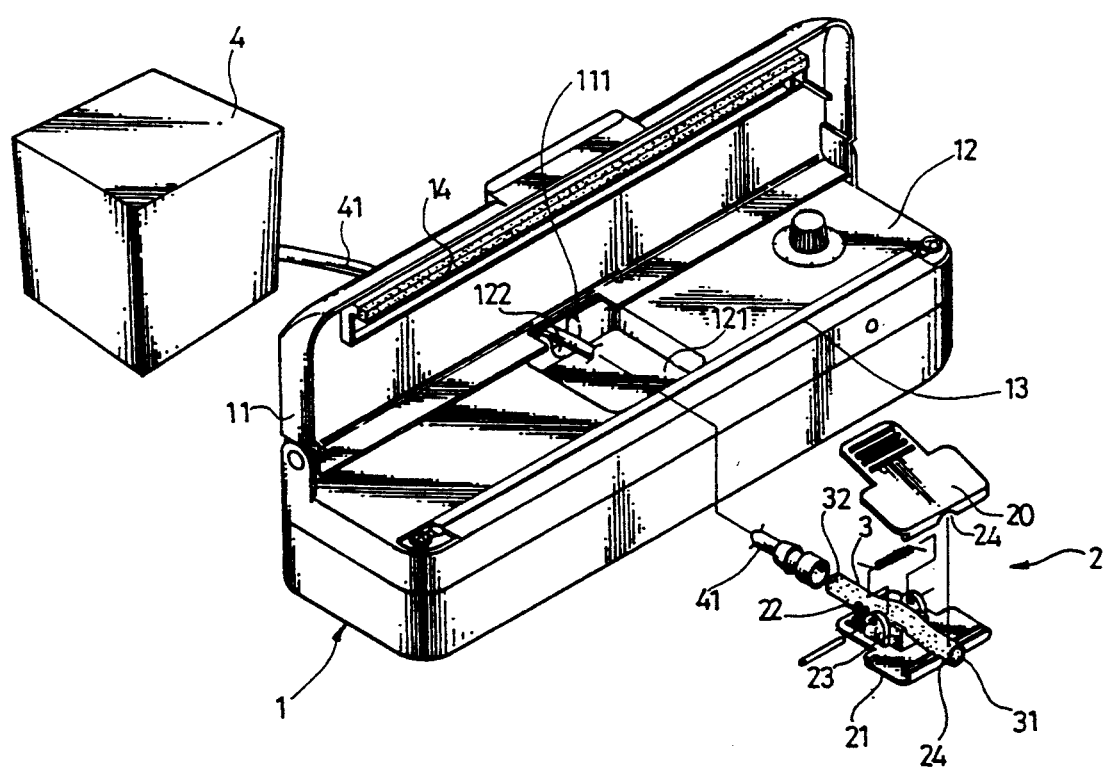
FIG. 1 is an exploded view of a heat sealing apparatus according to the preferred embodiment of the present invention.

Referring to FIG. 1, a heat sealing apparatus generally in accordance with the present invention comprises sealing unit 1, a clip 2, a guide tube 3, a vacuum ejector 4.

The sealing unit 1 comprises a base 12, a cover 11 including a rear side pivoted to the base 12 and a front side attached with a heat-resisting press bar 14, an electrical heating wire 13 fastened to the top of the base 12 along the side corresponding to the press bar 14 on the cover 11. The base 12 includes a top recess 121, and an arched hole 122 which is on one side of the top recess 121 and opposite to the electric heating wire 13. The cover 11 includes a notch 111 on the rear side thereof corresponding to the arched hole 122 on the base 12.

The clip 2 is received within the top recess 121 to hold the guide tube 3. The front end 31 and rear end of the guide tube 3 respectively extend out of the opposite ends of the clip 2. The rear end 32 of the guide tube 3 is inserted into the arched hole 122 and connected to the suction pipe 41 of the vacuum ejector 4.

Figure 2:
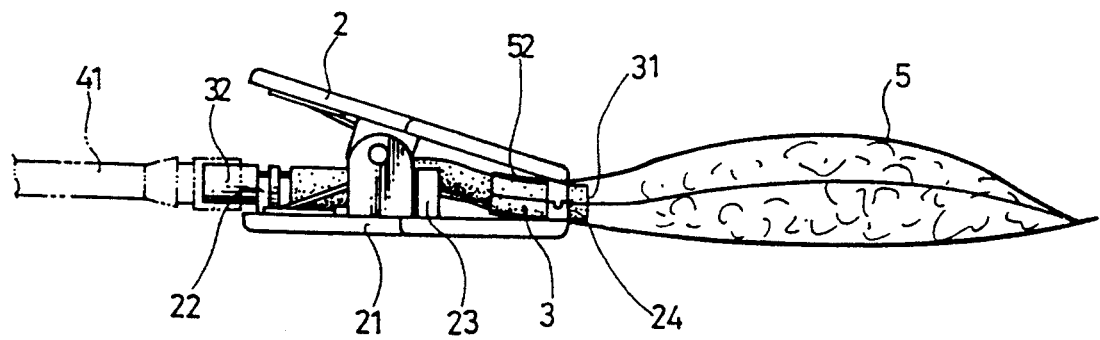
FIG. 2 shows the clip of the heat sealing apparatus clamping a plastic bag for allowing air to be withdrawn from the plastic bag by the vacuum ejector thereof.

Referring to FIG. 2 and FIG. 1 again, the clip 2 comprises a pivoting upper clamping plate 20 and a lower clamping plate 21, and works with a spring. The lower clamping plate 21 comprises two spaced holder frames 22, and 23 for supporting the guide tube 3 in place. Further, the upper and lower clamping plates 20, and 21 have a respective front half-round hole 24 matched with each other. When closed, the two half-round holes 24 on the upper and lower clamping plates 20, and 21 are linked into a round hole to hold the guide tube 3 in place.

Figure 3:
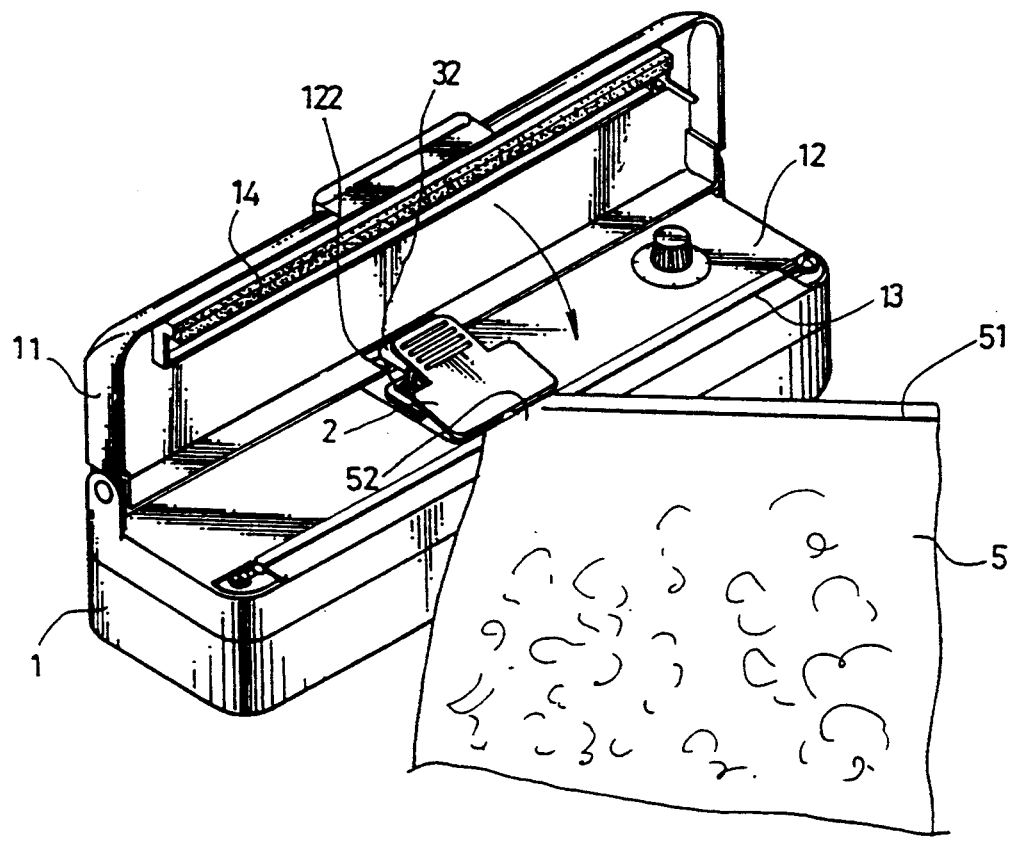
FIG. 3 shows the plastic bag completely sealed by the sealing unit of the heat sealing apparatus.

Referring to FIG. 3 and FIG. 2 again, the operation of the present invention is easy and outlined hereinafter. The opening of the plastic bag 5 to be sealed is placed on the electric heating wire 13 above the base 12, then sealed with a sealing line 51 being formed on the plastic bag 5 by pressing the press bar 14 on the opening of the plastic bag and against the electric heating wire 13. During this stage, the opening of the plastic bag 5 is not completely sealed, and a small opening 52 about 3 cm long is left on the plastic bag 5. Then, the clip 2 with the guide tube 3 and the suction pipe 41 of the vacuum ejector 4 are moved out of the base 12 of the sealing unit 1, and then the clip 2 is fastened to the plastic bag 5 permitting the front end 31 of the guide tube 3 to be inserted into the small opening 52 of the plastic bag 5. During the vacuum forming process, the operator can watch the withdrawn air carefully. If the guide tube 3 is blocked by the packed things in the plastic bag 5, the operator has hands free to move the packed things away from the front end 31 of the guide tube. After air was approximately completely withdrawn from the plastic bag by means of the operation of the vacuum ejector 4, the clip 2 with the retained plastic bag 5 are moved to the sealing unit 1 again, and then the small opening 52 on the plastic bag 5 is completely sealed.

Although only one embodiment of the present invention has been shown and described, it will be understood that various modifications and changes could be made without deviating from the spirit and scope of the invention.

What is claimed is:

1. A heat sealing apparatus comprising: a sealing unit, a clip, a guide tube, and a vacuum ejector, said sealing unit comprises a base, a cover including a rear side pivoted to said base and a front side including a heat-resisting press bar, an electrical wire fastened to the top of said base along one side thereof corresponding to said press bar, wherein said base includes a top recess, and an arched hole on one side of said top recess opposite to said electric heating wire; said cover includes a notch on a rear side thereof corresponding to said arched hole on said base; said clip is removably received within said top recess of said base, including a guide tube fastened thereto, said guide tube comprising a front and a rear end respectively extended out of said clip, said rear end of said guide tube being inserted into said arched hole on said base and connected to a vacuum ejector.

2. The heat healing apparatus of claim 1 wherein said sealing unit comprises a base, a cover comprising a rear side pivoted to said base and a front side including a heat-resisting press bar, an electrical wire fastened to the top of said base along one side thereof corresponding to said press bar, wherein said base includes a top recess, and an arched hole which is on one side of said top recess opposite to said electric heating wire; said cover includes a notch on a rear side thereof corresponding to said arched hole on said base; said clip comprises an upper clamping plate, a lower clamping plate, and a guide tube retained between said upper clamping plate and said lower clamping plate, said upper and lower clamping plates each including a respective front half-round hole matched with each other, said lower clamping plate having spaced holder frames to support said guide tube in place, said clip being removably received within said top recess of said base, said guide tube comprising a front end extended out of said clip through the half-round hole on either clamping plate, and a rear end inserted through said arched hole on said base and connected to a vacuum ejector.

* * * * *